Patented June 27, 1933

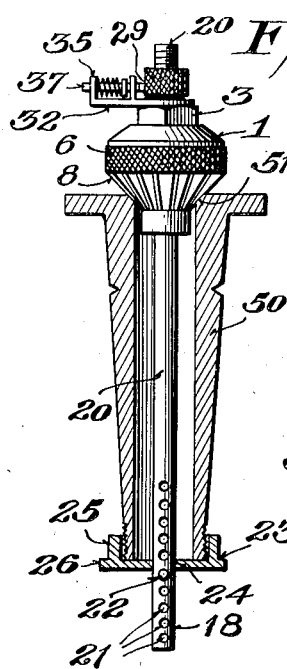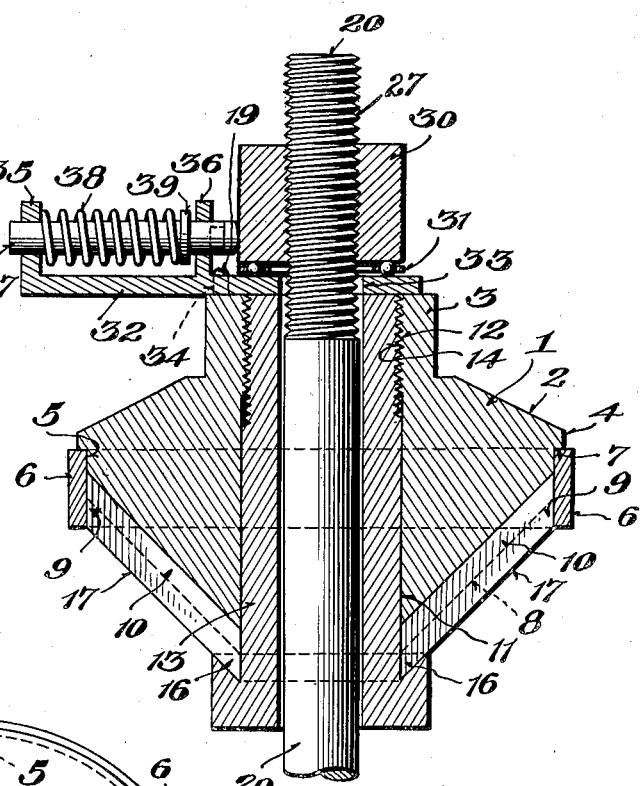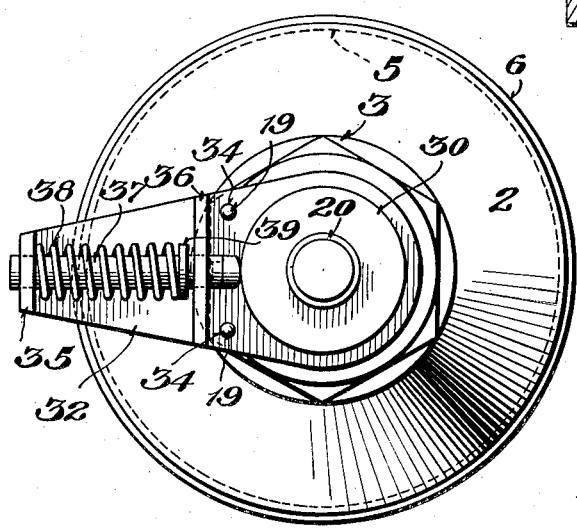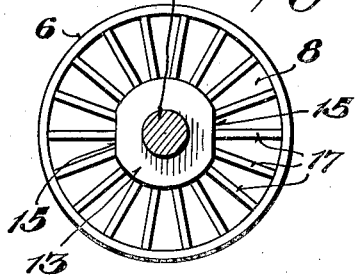

1,915,806

UNITED STATES PATENT OFFICE

BRYAN B. TALBOT, OF PORT ARTHUR, TEXAS, ASSIGNOR TO THE TEXAS COMPANY, OF NEW YORK, N. Y., A CORPORATION OF DELAWARE

REAMING TOOL

Application filed August 17, 1928. Serial No. 300,216.

This invention relates to a tool for reaming valve seats or the like, and is particularly suitable for reaming the type of seats commonly employed in the discharge valves of tanks and tank cars. The discharge openings of tanks and tank cars are usually provided with outlet projections or tubes extending downwardly from the tank beyond the valve seat.

The operation of reaming such a valve seat has heretofore been a difficult and tedious operation, and has met with little success. The principal difficulties encountered in using prior types of reamers have been due to the necessity for the worker to press the reamer against the valve seat, hold it against wobbling, and at the same time turn it so as to produce the desired cutting effect of the blades. Oftentimes it was necessary to ream the valve seat several times before satisfactory results were accomplished, and, in addition, considerable grinding and filing was sometimes necessary after the reaming operation.

One object of this invention is to provide a tool for reaming valve seats which will relieve the worker of the burden of manually holding the reamer steady during a reaming operation.

Another object thereof is to provide an arrangement whereby it will not be necessary for the worker to manually press the reamer against the valve seat being reamed.

A still further object thereof is to provide a mechanism for reaming valve seats which will automatically feed and force the reamer blades against the surface being reamed, and will maintain a predetermined definite pressure against said surface irrespective of the rate at which said surface is being cut away by the blades.

Another object of this invention is to provide a reamer which is substantial, strong, and simple in construction, quickly and easily assembled or dissembled, relatively cheap to manufacture, and more particularly easy to use and efficient in results.

Other objects and advantages of the invention will become apparent from the description of a preferred form of a tool embodying the invention which follows:

In the drawing, Fig. 1 is a side view of the reamer mechanism, assembled and in operative position in a common type of tank car discharge opening;

Fig. 2 is a side sectional view, to an enlarged scale, of the head of the reamer illustrating the construction thereof;

Fig. 3 is a plan view of the reamer head, and

Fig. 4 is a bottom view thereof to a slightly reduced scale.

As illustrated, the reamer mechanism comprises a reamer head 1, a guide mechanism 18, and a feed mechanism 29. In Fig. 1, the reamer mechanism is shown assembled and in operative relation to a tank car valve seat to be reamed. The type of valve illustrated consists of an elongated tube or spout 50 which is attached to and depends from a tank car (not shown). A valve mechanism is adapted to cooperate with the spout 50 and the valve seat 51. When the valve seat becomes scored or damaged in use and it is necessary to ream the seat, the valve mechanism is removed and the reamer is inserted as illustrated.

The reamer head 1 consists of a block 2 having a reduced hexagonal upper portion 3. This hexagonal portion is adapted to be engaged by a wrench for the purpose of turning the reamer head to produce the cutting action on the valve seat. The reamer head has an enlarged circular central portion 4, and around this enlarged portion an annular notch or recess 5 is formed. An annular band 6 closely fits upon the enlarged portion 4 of the reamer head block 2, so that the upper portion of the band is within the annular notch 5 and the upper edge of the band is against the shoulder 7 formed by notch 5. The lower portion of the band 6 projects downwardly from the enlarged portion 4 of the reamer head block.

The lower part 8 of the reamer head block is in the shape of an inverted truncated cone. This cone-shaped portion of the block forms, with the downwardly projecting portion of the band 6, an annular recess 9.

A number of upwardly radiating grooves or slots 10 are formed in the conical lower portion 8 of the reamer head block. These grooves extend from the lower extremity of the block to the recess 9 formed by the conical portion 8 and the band 6.

The reamer head block 2 has a central bore 11, the upper portion of which is internally threaded as indicated by numeral 12. A tubular member or sleeve 13 fits within the central bore 11 of the reamer head block and the upper end thereof is provided with external screw threads 14 which are adapted to engage with the internal screw threads 12 of the reamer head block bore 11. The upper end of the tubular member 13 is preferably flush with the upper surface of the hexagonal portion 3 of the reamer head block. The tubular member 13 is longer than the reamer head block so that the lower portion thereof projects beyond the lower end of the block. The projecting portion is enlarged and, as shown in Fig. 4, is provided with a pair of oppositely disposed flat sides 15, to facilitate screwing the tubular member into the reamer head block. The upper surface of the enlarged lower portion of the tubular member 13 is undercut, forming an annular recess 16.

The reamer is provided with a plurality of cutting blades 17, and each of said blades is seated within one of the upwardly radiating slots 10. The upper end of each blade is positioned within the recess 9 and is held therein by band 6.

The lower end of each blade is held in place by the annular recess 16 of tubular member 13. To remove the blades it is only necessary to unscrew the tubular member 13 from the reamer head block so as to release the lower ends of the blades from the recess 16, whereupon the blades are free to be removed from the assembly.

The tubular member 13 is adapted to receive, when the reaming mechanism is assembled for use, a rod 20 having a diameter substantially equal to the opening therethrough. The lower part of the rod 20 is provided with a series of laterally drilled holes 21, and a pin 22 of greater length than the diameter of the rod is adapted to be inserted in one or another of said drilled holes 21. When the tool is in use, the rod 20 projects through the bottom of the discharge spout of the tank as shown in Fig. 1.

A cup-shaped member 23 having a central perforation 24 is placed on the lower end of the rod and the pin 22 is inserted in one of the holes 21 in such a position as to engage the under side of the member 23. The cup-shaped member 23 has an upstanding flange 25, the inner diameter of which is sufficient to allow the lower end of the discharge spout 50 to pass within it but only slight lateral movement of the cup 23 or rod 20 is permitted. The bottom plate of the cup 23 extends outwardly beyond the flange 25 as indicated by numeral 26. In case the lower end of a discharge spout were larger than the flange 25, the flange could be inserted within the spout and the outer portion 26 of the bottom plate would bear against the lower end of the spout. It will be apparent that the length of the discharge spout determines which hole 21 is employed to receive the pin 22.

The upper end portion of rod 20 is provided with screw threads 27, and a nut 30 is disposed on said threaded end. When the nut 30 is turned down along the rod 20, it will force the reamer head down and will bring the blades into cutting engagement with the valve seat 51 to be reamed.

Between the nut 30 and the reamer head 1 a ball thrust bearing 31 may be placed. This bearing permits the downward pressure of nut to be transmitted to the reamer head, but prevents the rotary motion of the reamer head from affecting the nut, except as may be otherwise provided for.

It should be noted that rod 20 is held against upward movement by the cup 23 and pin 22 and that it is held against downward movement by reamer head 1 and nut 30.

The reamer head is given a rotary motion by means of any suitable type of wrench engaging the hexagonal portion 3 of the reamer head block. The worker need not exert any effort to prevent the reamer from wobbling since the mechanism hereinbefore described will hold the reamer head steady. Likewise, it is unnecessary for the worker to press downwardly upon the reamer since this is taken care of by nut 30. As the face of the valve seat is cut away the reamer will tend to loosen. The worker may then grasp the nut 30, which may be knurled, and turn the nut down so as to tighten the reamer head against the valve seat.

This tightening operation may be done manually as above described, but the reaming mechanism is preferably provided with means for automatically turning the nut 30 as the valve seat wears away, thus maintaining a constant pressure of the tool against the valve seat. In the form illustrated in the drawing, a plate or bracket 32 is provided, the end of which extends between the ball thrust collar 31 and the reamer head 1. The bracket 32 has a hole 33 formed therein through which the rod 20 may pass and is provided with one or more small perforations 34 to receive dowel pins 19, extending upwardly from the surface of hexagon 3. The member 32 is thus locked against movement relative to the reamer head 1, so that, as the worker turns the reamer head, the bracket 32 is also caused to turn.

The bracket 32 is provided with an upstanding lug 35 at its outer end and also with a similar lug 36 spaced inwardly from the first lug. Each of these lugs is provided with an opening which acts as a guide for a plunger 37. A coil spring 38 surrounds the plunger 37 and one end thereof engages the lug 35, while the other end presses against an annular shoulder 39 formed on the plunger. The spring 38 presses the plunger 37 inwardly, and the inner end of the plunger is thereby constantly kept in frictional engagement with nut 30. Thus, as the reamer head 1, plate 32, and plunger 37 are turned, the frictional engagement of the inner end of plunger 37 against nut 30 tends to turn said nut downwardly, and keeps the cutting blades 17 in cutting engagement with the valve seat being reamed.

The tool herein described provides for the reaming of tank car valve seats and other valve seats in a quick and efficient manner. The difficulties caused by wobbling of the reamer during the operation are entirely overcome. The desired angle of bevel of the valve seat is ensured. The face of the valve seat is made smooth and regular so that little, if any, grinding or filing is found necessary after the reaming operation. Furthermore the worker is relieved of the tiresome and irksome burden of manually pressing upon the reamer during the reaming operation.

I claim:

1. A reaming mechanism comprising a rod, a reamer head on said rod, a nut on said rod, a bracket secured to said reamer head, a spring-pressed plunger guided by said bracket, and having friction engagement with said nut, whereby a turning movement of said head tends to turn said nut.

2. In a mechanism for reaming tank car valves, a rod having a series of lateral holes through one end portion thereof, a pin insertable in one of said holes, a cup-shaped member having a central aperture on said rod, a reamer head block on said rod, a plurality of inclined blades clamped to said block, a nut threaded on said rod, and a spring-pressed plunger secured to said reamer head block and frictionally engaging said nut so that the turning movement of said reamer head will tend to turn said nut on said rod.

3. In a reaming mechanism, a rod having a threaded portion at one end, a reamer head rotatably and slidably mounted on said rod, a bracket secured to said reamer head to rotate therewith, a nut threaded on said rod, said nut having a roughened outer surface, an antifriction bearing between said nut and said reamer head, and a spring-pressed plunger supported in said bracket substantially perpendicular to said rod, one end of said plunger frictionally engaging the roughened surface of said nut so that a rotary movement of said reamer head and bracket will tend to thread said nut along said rod.

4. In a mechanism for reaming tank car valve seats which are provided with outwardly projecting elongated tubes, a rod having a series of lateral holes through one end portion thereof, a pin insertable in one end of said holes, a cup-shaped member having a central aperture and adapted to engage said rod and the outer end of said tube so as to hold said rod in concentric spaced relation with respect to said tube, a reamer head on said rod, a bracket secured to said reamer head, a nut threaded on said rod, and a spring-pressed plunger guided by said bracket and bearing against said nut, whereby a turning movement of said reamer head tends to turn said nut and thread said nut along said rod.

In witness whereof I have hereunto set my hand and seal this 9th day of August, 1928.

BRYAN B. TALBOT.